US008202385B2

(12) United States Patent
Torres Martínez

(10) Patent No.: US 8,202,385 B2
(45) Date of Patent: Jun. 19, 2012

(54) HEAD FOR APPLICATION OF CARBON-FIBRE STRIPS AND APPLICATION METHOD

(76) Inventor: Manuel Torres Martínez, Pamplona (ES)

(\*) Notice: Subject to any disclaimer, the term of this patent is extended or adjusted under 35 U.S.C. 154(b) by 682 days.

(21) Appl. No.: 12/309,972

(22) PCT Filed: Jun. 28, 2007

(86) PCT No.: PCT/ES2007/000382
§ 371 (c)(1),
(2), (4) Date: Feb. 5, 2009

(87) PCT Pub. No.: WO2008/020094
PCT Pub. Date: Feb. 21, 2008

(65) Prior Publication Data
US 2009/0266485 A1    Oct. 29, 2009

(30) Foreign Application Priority Data

Aug. 8, 2006  (ES) .................................. 200602154

(51) Int. Cl.
*B65H 81/00* (2006.01)

(52) U.S. Cl. ........ 156/166; 156/169; 156/173; 156/175; 156/425; 156/433; 156/441; 156/523

(58) Field of Classification Search .................. 156/169, 156/173, 175, 166, 433, 441, 573, 523, 425
See application file for complete search history.

(56) References Cited

U.S. PATENT DOCUMENTS

| 2,122,292 | A | * | 6/1938 | Petersen ............................ 87/57 |
| 2,436,067 | A | * | 2/1948 | Fonda ............................. 139/104 |
| 3,122,872 | A | * | 3/1964 | Mumby ............................. 57/17 |
| 3,810,805 | A | * | 5/1974 | Goldsworthy et al. ....... 156/361 |
| 4,292,108 | A | | 9/1981 | Weiss et al. |
| 4,699,683 | A | | 10/1987 | McCowin |
| 4,943,338 | A | | 7/1990 | Wisbey |
| 5,110,395 | A | * | 5/1992 | Vaniglia ......................... 156/353 |
| 6,544,367 | B1 | * | 4/2003 | Fujimoto et al. .............. 156/187 |
| 6,799,081 | B1 | * | 9/2004 | Hale et al. ........................ 700/98 |

FOREIGN PATENT DOCUMENTS

| ES | 2 114 413 A1 | 5/1998 |
| ES | 2 212 878 A1 | 8/2004 |
| WO | WO 99/22932 A1 | 5/1999 |
| WO | WO 2006021601 A1 | 3/2006 |

OTHER PUBLICATIONS

Flory, Robert, et al, "Effect of Steering and Conformance Requirements on Automated Material Deposition Equipment", pp. 1-11, Charles Stark Draper Laboratory, Inc., Cambridge Ma., at least available as of Sep. 28, 2004.*

* cited by examiner

*Primary Examiner* — Jeff Aftergut
(74) *Attorney, Agent, or Firm* — The Nath Law Group; Jerald L. Meyer; Stanley N. Protigal

(57) ABSTRACT

The invention relates to a head for application of carbon-fibre strips that has at least two spools (1) conveying respective carbon-fibre strips for the selective feed of said strips and in order thus with said strips to make up the width of the stripping for application. These spools (1) are arranged on a master roller (5) formed by independent sections that are actuated individually by respective rotary transmissions.

12 Claims, 16 Drawing Sheets

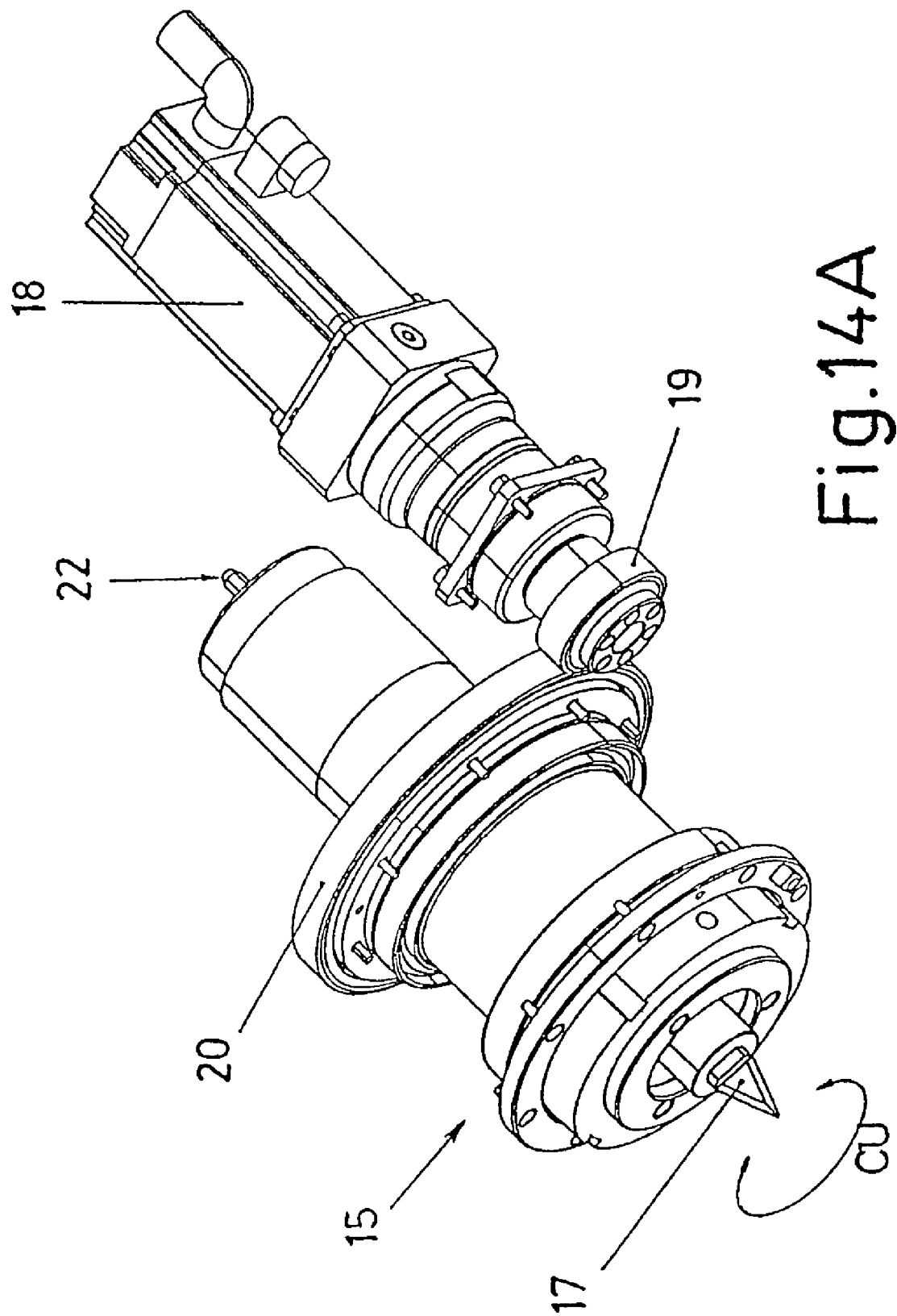

HEAD FOR APPLICATION OF CARBON-FIBRE STRIPS AND APPLICATION METHOD

FIELD OF THE ART

The present invention relates to the manufacture of parts, by means of applying strips of carbon fibre, especially for the aeronautical industry, proposing a system with particular features in relation to an applicator head with multiple strips and the application method for applying said strips on the surface to be formed.

STATE OF THE ART

In the construction of aeronautical structures the joints between the component parts are the most critical resistance parts, whereby the largest possible parts tend to be used for the purpose of reducing the number of joints.

However, the increase in the size of the parts involves at the same time an increase in the complexity thereof, machinery capable of fulfilling the qualities of the application in the complexity conditions of the large parts being required.

Thus, for example, the complexity of the surface of the parts includes the providing curved areas, which in the formations by means of laying strips of carbon fibre, as is done in the construction of aeronautical parts, involves a problem since the radii of curvature which can be made depend on the width of the carbon-fibre bands which are used in the application, such that the greater the width of the band which is applied, the less the radius of the curvatures which can be made in the application must be closed, i.e., a larger radius is necessary to avoid wrinkles in the band used.

In the heads for laying strips known until now, called tape layer machine, the head applies a single strip which can have different width measurements, i.e., 300, 150 or 75 mm, but always one and the same strip.

The highest productivity is achieved with the 300 mm wide strip, whereas curvatures with more closed radii can be traced with the 75 mm strip.

The width of the band for application proportionally affects the productivity of the processes for forming the parts by means of said strip laying with carbon fibre, such that the smaller the width of the stripping for application, the greater the number of passes that have to be performed and, therefore, the greater the amount of time necessary and the lower the productivity.

In addition, it must be taken into account that the carbon fibre of the strips for application which are used for the indicated function are impregnated with a resin, such that the duration from when the strip leaves the manufacturing autoclave is about ten days, during which time the strip must be used and if it is not it must be disposed of; whereby the productivity of the application is important to achieve a rapid use of the strips for the purpose of reducing as much as possible the losses of material due to ageing thereof.

Apart from these tape layer machines which lay strips from one an the same carbon-fibre strip, other machines are known called fiber layer machines which use narrow carbon fibres by way of threads wound on multiple reels.

OBJECT OF THE INVENTION

According to the invention a head for the application of carbon-fibre strips is proposed, with which functionality features are achieved which allow advantageously solving the problems for the formation of large and complex parts by means of stripping with said strips.

According to this system, the head is of the tape layer machine type, i.e., of those using carbon-fibre strip wound on a paper support and not a multiplicity of carbon fibres wound on fiber layer machine spools. However compared to traditional solutions in which the head used one and the same 300, 150 or 75 mm strip, now and according to the system object of the present invention, the head uses at least two strips, and preferably four, carbon-fibre strips, each of them 75 mm wide such that if the head applies the four strips at the same time it reaches the standard 300 mm width measurement, which is that affording the highest productivity and which allows tracing very closed radii without wrinkles in the strips occurring. In contrast, when the areas are curved, depending on the radius thereof two 150 mm strips can be used, always maintaining a total stripping width of 300 mm, or even a single strip of 300 mm also, if the radius of the curve is very large and the part is virtually planar.

Indeed, according to the object of the invention an applicator head is used in which there are arranged at least two reels of carbon-fibre strips and preferably four reels, said reels being incorporated on a master roller formed by a makeup of independent consecutive portions, which are associated to respective rotary actuation transmissions which are controlled by means of computer programming, the strips being provided, when being wound on the spools, with the conventional protective paper which is separated and collected in independent take-up spool, one for each reel, when the carbon strips are applied on the surface to be formed.

The strips for application are conveyed from the feed reels to the application area, passing through guides which keep them separated, a multiple heel with independent portions for pressing on each of the strips being provided in the application area, such that each strip is applied or not on the surface to be formed by means of stripping according to said pressure.

A head is thus obtained by means of which strips of different widths, the same or not, can be applied for the formation of a stripping with an application width equivalent to that of a very wide band, which allows establishing, by means of controlling the transmission of the rotary actuation to the reels of the carbon-fibre strips, the continuous or uninterrupted application of each of the strips, according to the requirements of the surface to be formed, as well as individually varying the speed of the feed of the different strips, for adapting the application on the curves of the surface to be formed, which allows offsetting the greater range of travel for the application in the outer part of the curve than in the inner part, maintaining the tension in the strips used along the entire width of the application, without them being deformed.

A larger or smaller number of carbon-fibre strips can therefore be used according to the curvatures which the application requires. Furthermore, an application width can be covered with the group of individual strips used at the same time in the same way as with a very wide band such that, for example, two 150 mm wide strips, or four 75 mm wide strips, can be used for an application width of 300 mm, without these measurements or the number of reels being limiting, being able to be adapted in each case and according to the surface to be made and the optimum productivity.

The assembly of the reels for the carbon-fibre strips is included with an axial positioning arrangement by means of an automatically controlled longitudinal drive screw, which locates each of the reels on the master roller in correspondence with the respective guides for conveying the strips; and with a rotary fixing system for fixing each of the reels on the corresponding portion of the master roller by means of radial pressure plates arranged in said portion of the master roller, which are actuated pneumatically, a diametrical expansion of the mentioned portions of the master roller being defined therewith to fix to the reels thereon.

In relation to the feed of each carbon-fibre strip from the corresponding reels, an independent sensor is arranged whereby controlling the actuation of the rotary transmission to the reels is to adjust the application speed of each of the strips as needed, maintaining a correct application tension in said strips. Said sensors are furthermore provided with an oscillating movement arrangement, which allows offsetting the variation of inertia of the reels according to the amount of the strip thereof consumed.

The replacement of the strip-holding reels can be done individually, when the strip contained therein runs out, in each case changing the reel that runs out, or replacing the entire group of reels when one of them runs out, which reduces the number of necessary replacements and stops but entails the waste of the material remaining on the unfinished reels.

An alternative for achieving a better exploitation of the strips for application with a minimum number of replacements of the reels holding said strips consists of applying a software program for managing the feed of the strips in combination with a programme of successive uses of the applicator head for the formation of different parts, such that the software calculates the ranges of travel that must be performed in the different uses for applying the stripping in order to perform these uses such that the greater consumption of strips in application uses is offset with the greater consumption of the other strips in other uses, whereby all the reels holding the strips for application run out at the same time and can be replaced at the same time, without wasting the material thereof.

According to the invention, an ultrasound cutting unit oriented towards the side of the head is incorporated in a shaft parallel to the shaft of the master roller for incorporating the carbon-fibre strip feed reels, such that by means of rotating the head at 90° with respect to the carbon-fibre strip application position, the mentioned cutting unit is in the operative position to cut the remainder of the applied strips.

The overall working time in applying the carbon-fibre strips is thus considerably reduced, since the strips are applied and the remainder thereof is cut with the same head, furthermore being a much simpler and cheaper assembly of the necessary means, since the operative positioning of the cutting unit is done by means of rotating the head on one of its own assembly shafts.

The head and method proposed herein therefore offer very advantageous functional features for forming parts by means of stripping with carbon fibre, this system acquiring its own identity and preferred character with respect to the means used until now for the same function.

DESCRIPTION OF THE DRAWINGS

FIG. 14A is a perspective view showing the actuation means for actuating the cutting unit (15).

DETAILED DESCRIPTION OF THE INVENTION

The object of the invention relates to a head for the application of carbon-fibre strips for forming parts for the aeronautical industry or the like, with improvements in the head used for said function and in the application method.

Figure 1:
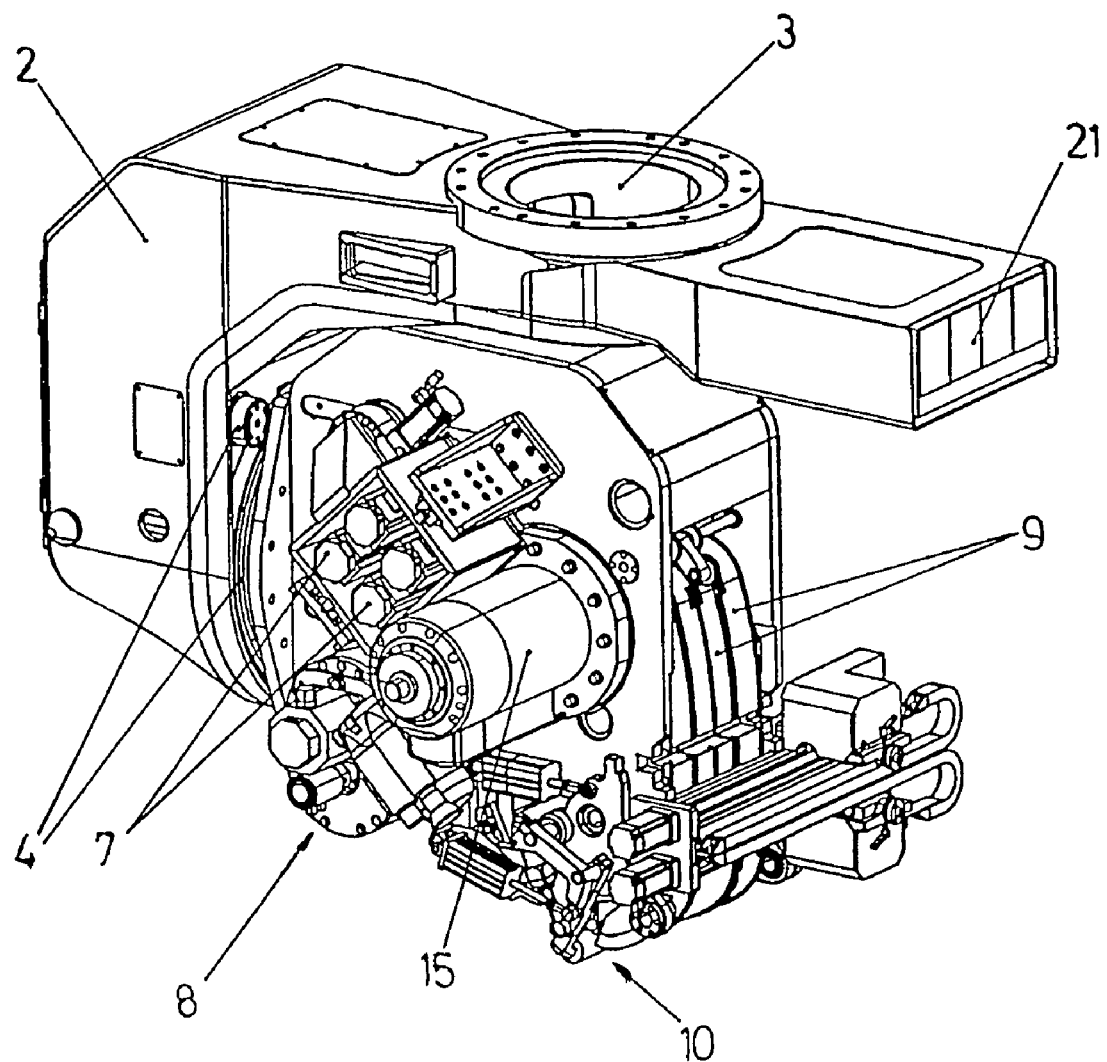
FIG. 1 shows a perspective view of a head for the application of carbon-fibre strips according to the invention.
Figure 2:
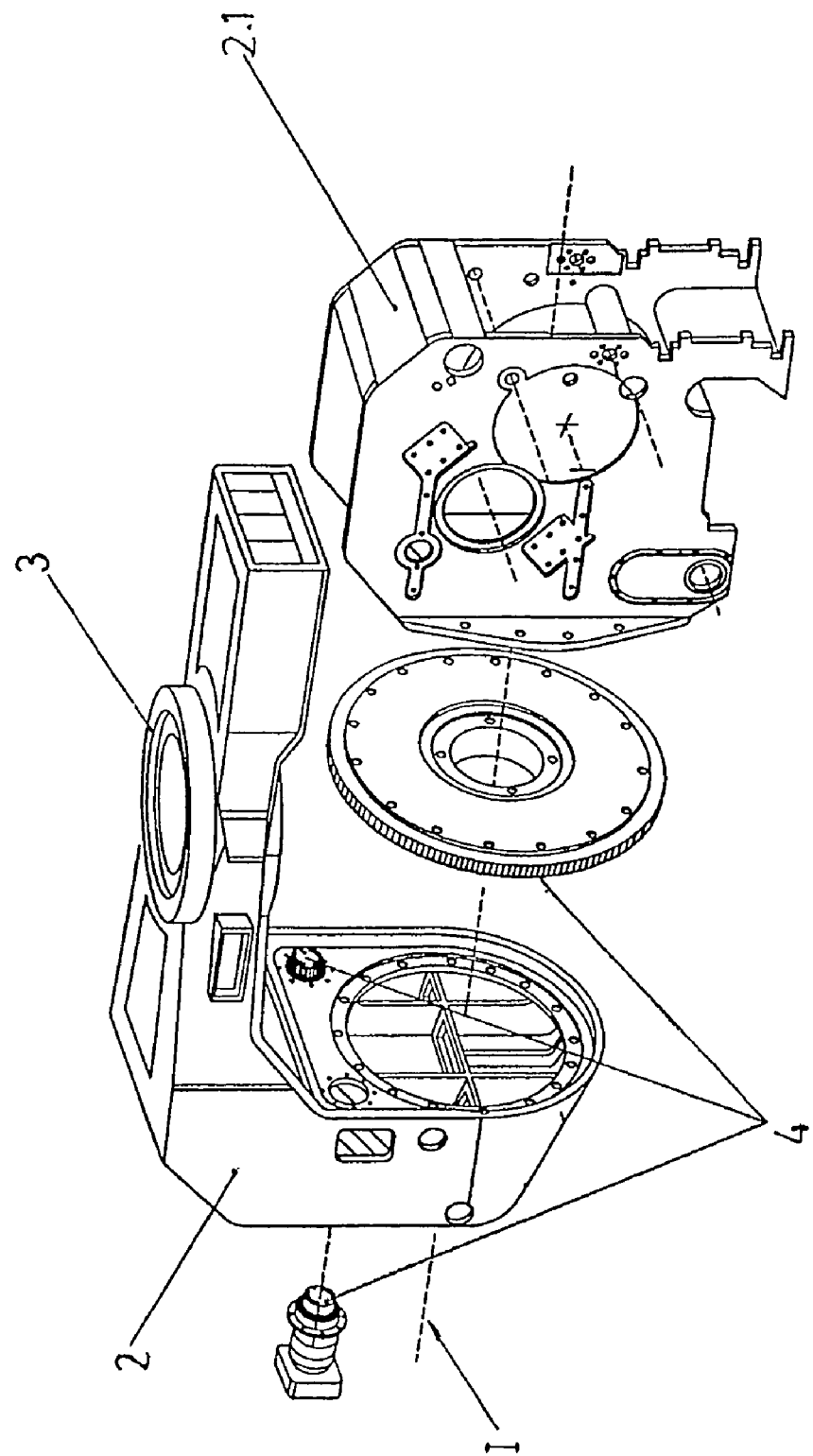
FIG. 2 shows an exploded view of the parts of the head corresponding to its general frame.
Figure 3:
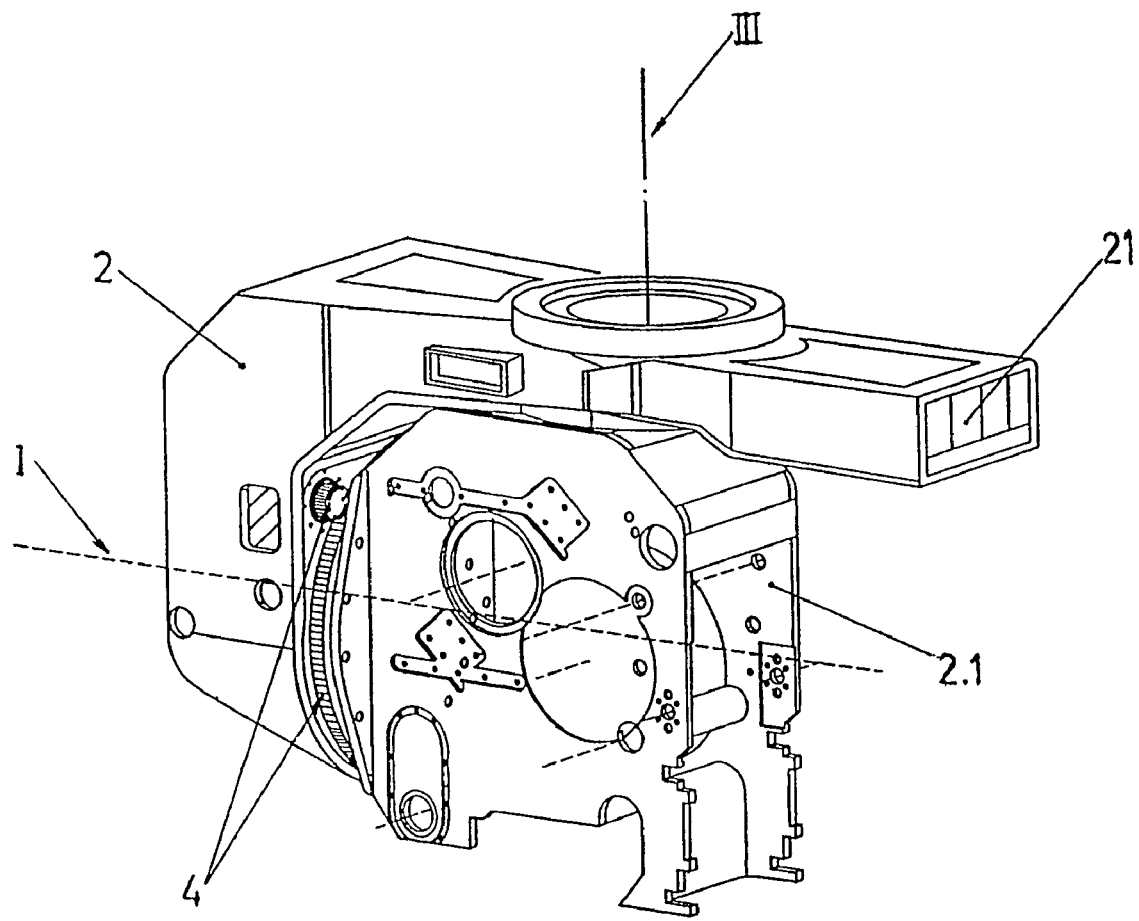
FIG. 3 is a perspective view of the head like FIG. 2 but with the parts already arranged in their assembly position.

The head is conventionally arranged on a rotary movement support (2) with respect to an assembly coupling (3) of vertical axis III, whereas the block (2.1) or actual head is incorporated in "pinion-crown" rotary assembly (4) of the horizontal axis I on the mentioned support (2), see FIGS. 1, 2 and 3.

According to the invention, at least two carbon strip feed reels (1) for feeding the carbon strips to be applied are arranged in the head.

Figure 10:
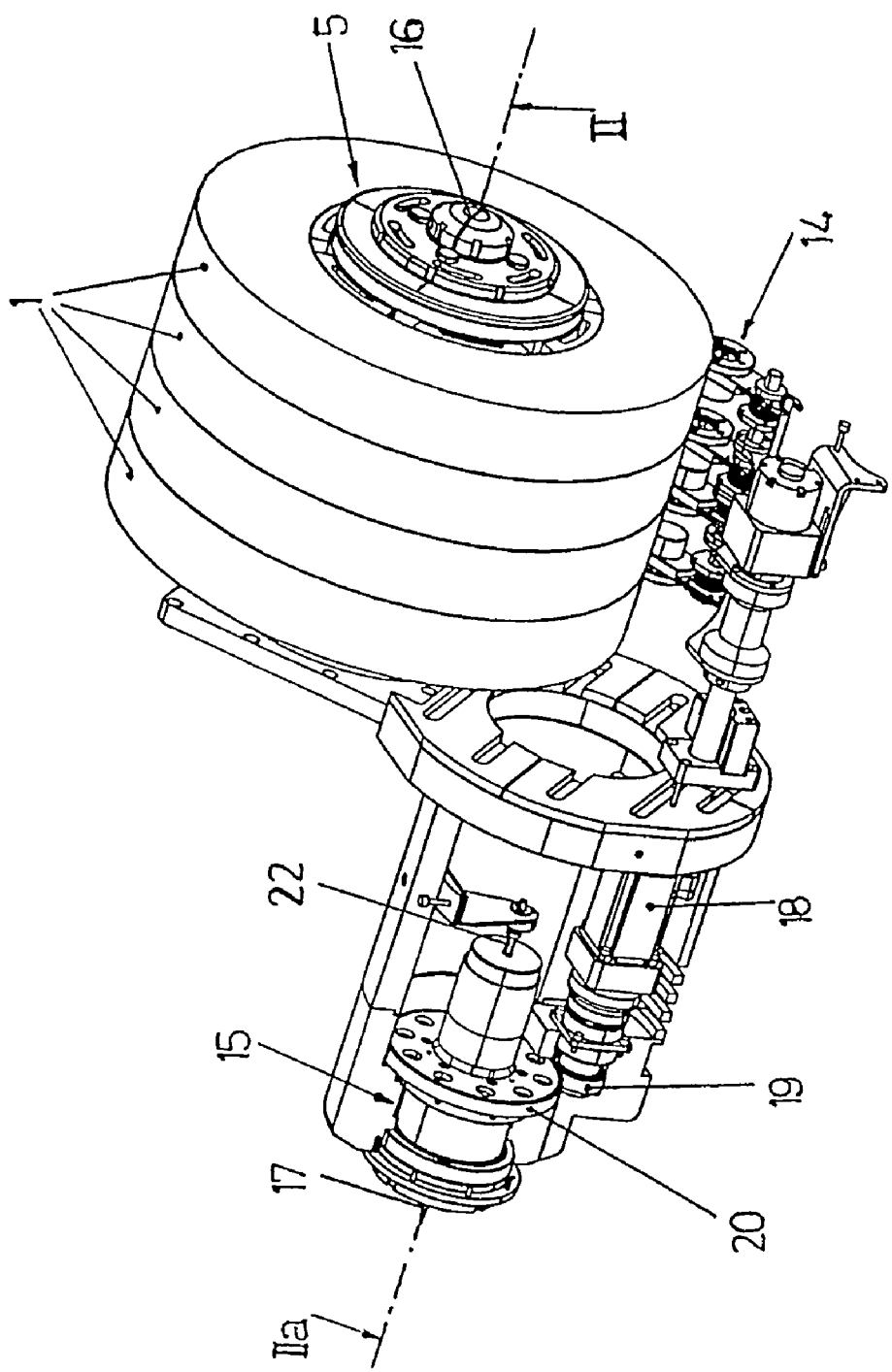
FIG. 10 is a perspective view of the assembly of the master roller (5) for assembling the reels (1), with the block of sensors (14) for regulating the feed of the carbon-fibre strips.

According to the non-limiting practical embodiment which is depicted in the attached drawings, the head has, as is seen in FIG. 10, four reels (1), on each of which a carbon-fibre strip with a width measurement of 75 mm is wound. Thus, if the head applies the four carbon-fibre strips at the same time it achieves covering a width of 300 mm and thereby maximum productivity; whereas if only one 75 mm wide reel (1) is used very closed radii can be traced without producing wrinkles; thus one, two or three or the four reels (1) will be used according to the curvature of the radii to be traced. When the head is used to cover less complex surfaces, it is possible to use, for example, two 150 mm reels (1), covering a size in width of 300 mm, or even a single 300 mm wide reel (1) which allows developing curves with large radii for virtually planar parts.

Figure 9:
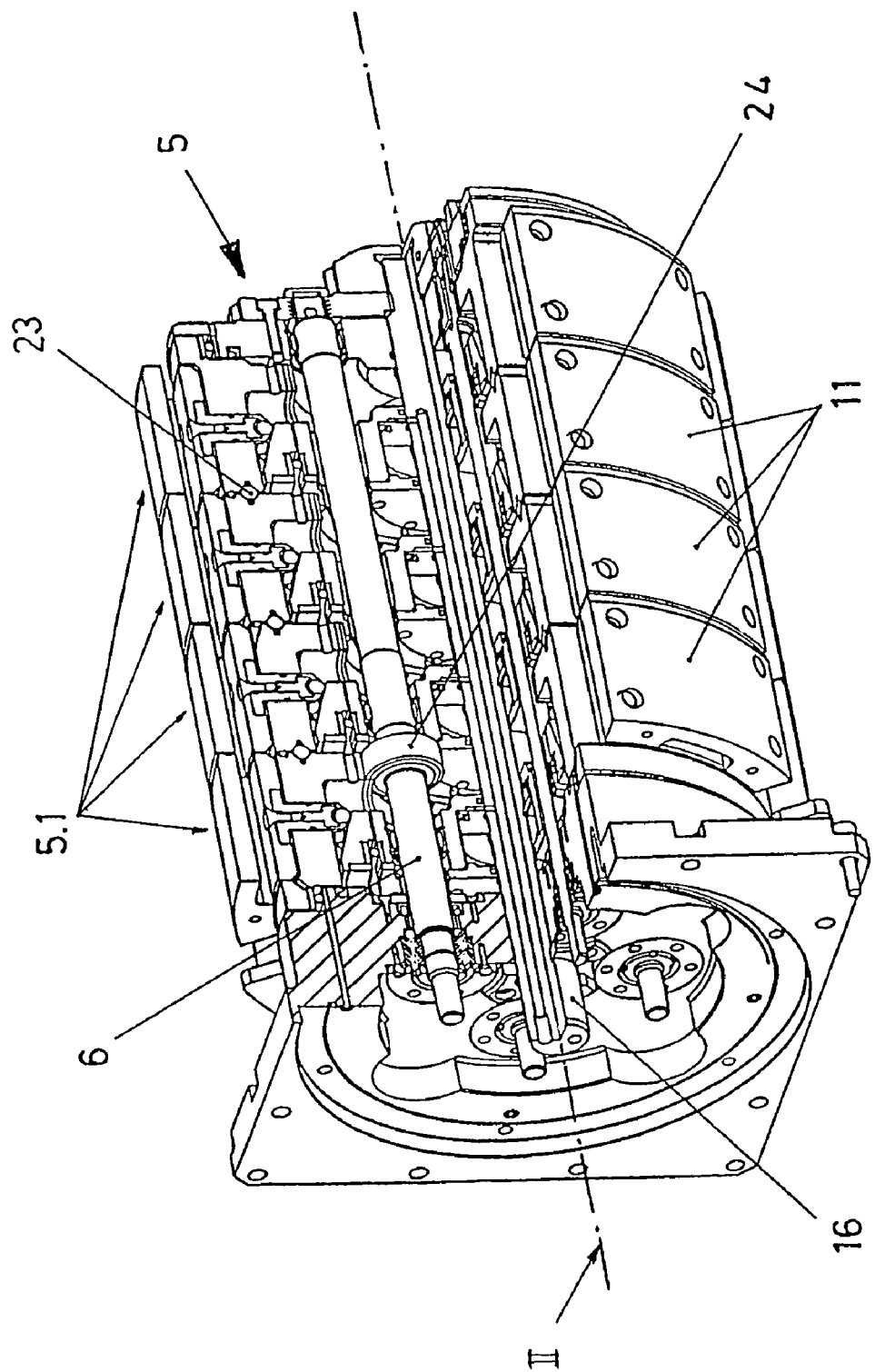
FIG. 9 is a perspective view with a longitudinal section of said master roller (5), without the drive motor unit.

The reels (1) are incorporated on a master roller (5) which is formed by a makeup of independent consecutive rings (5.1) which are assembled on a shaft (16), see FIG. 9, the theoretical longitudinal axis II of which is perpendicular to the horizontal axis I.

Figure 6:
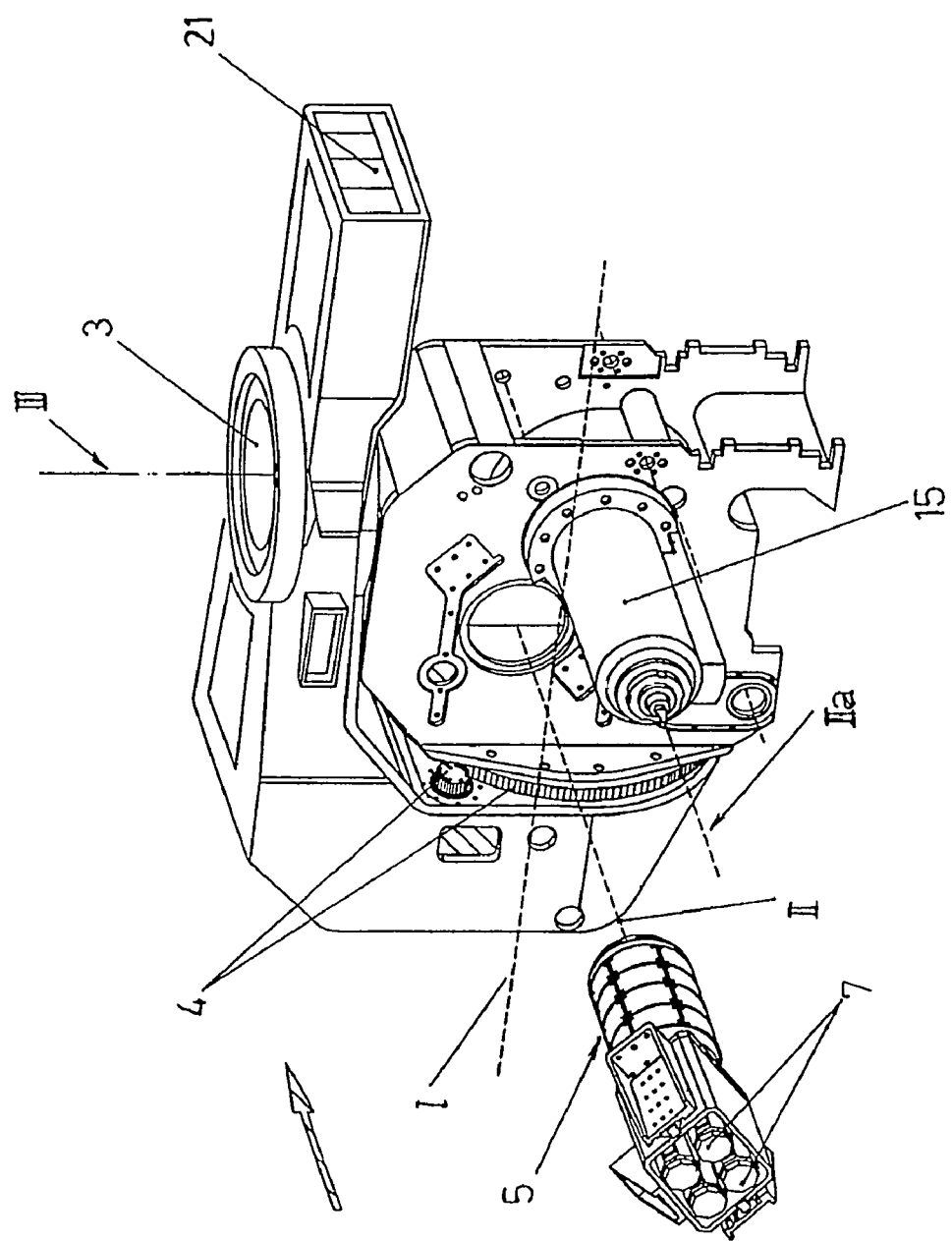
FIG. 6 shows a perspective view of the phase for assembling the master roller (5).
Figure 7:
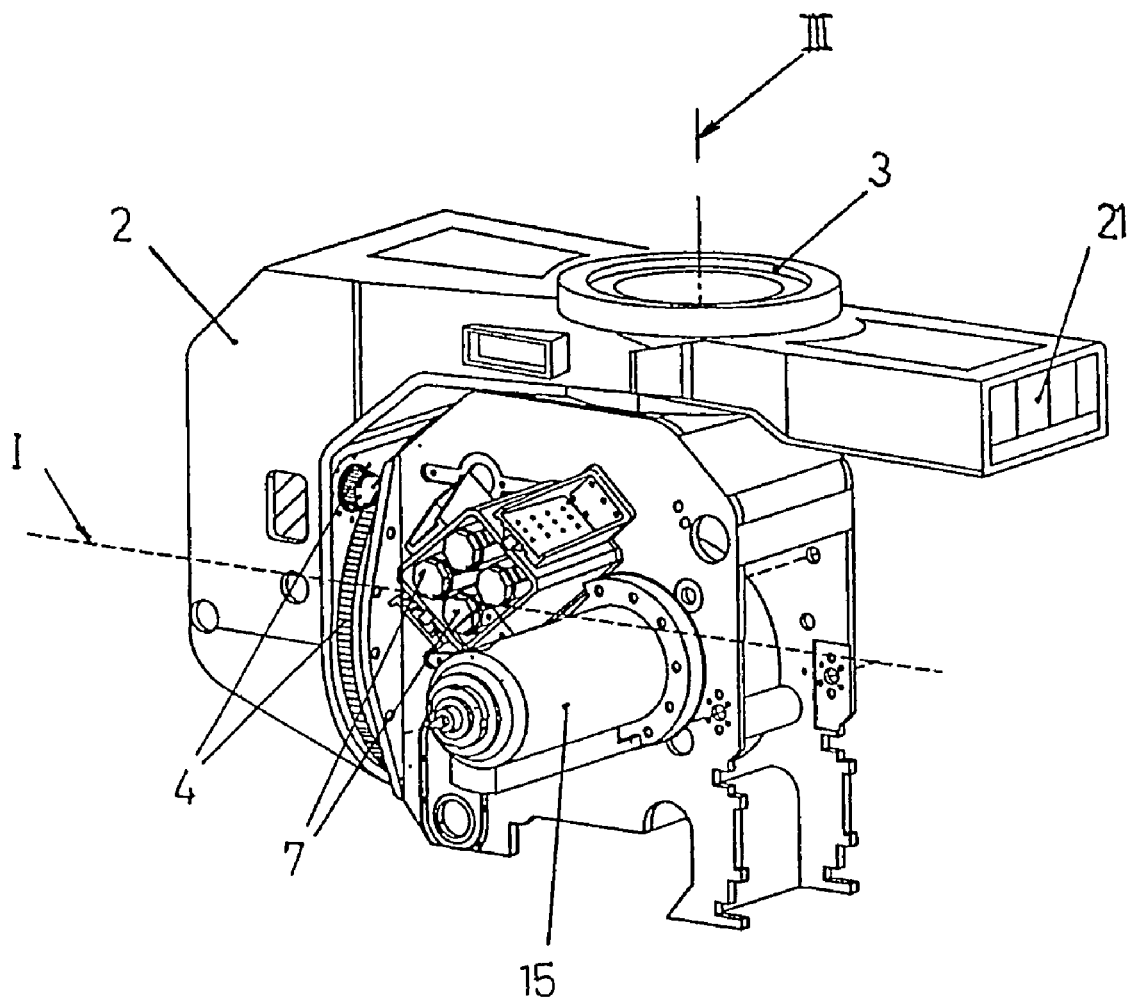
FIG. 7 is a view like that of FIG. 6 but with the master roller (5) already assembled.
Figure 8:
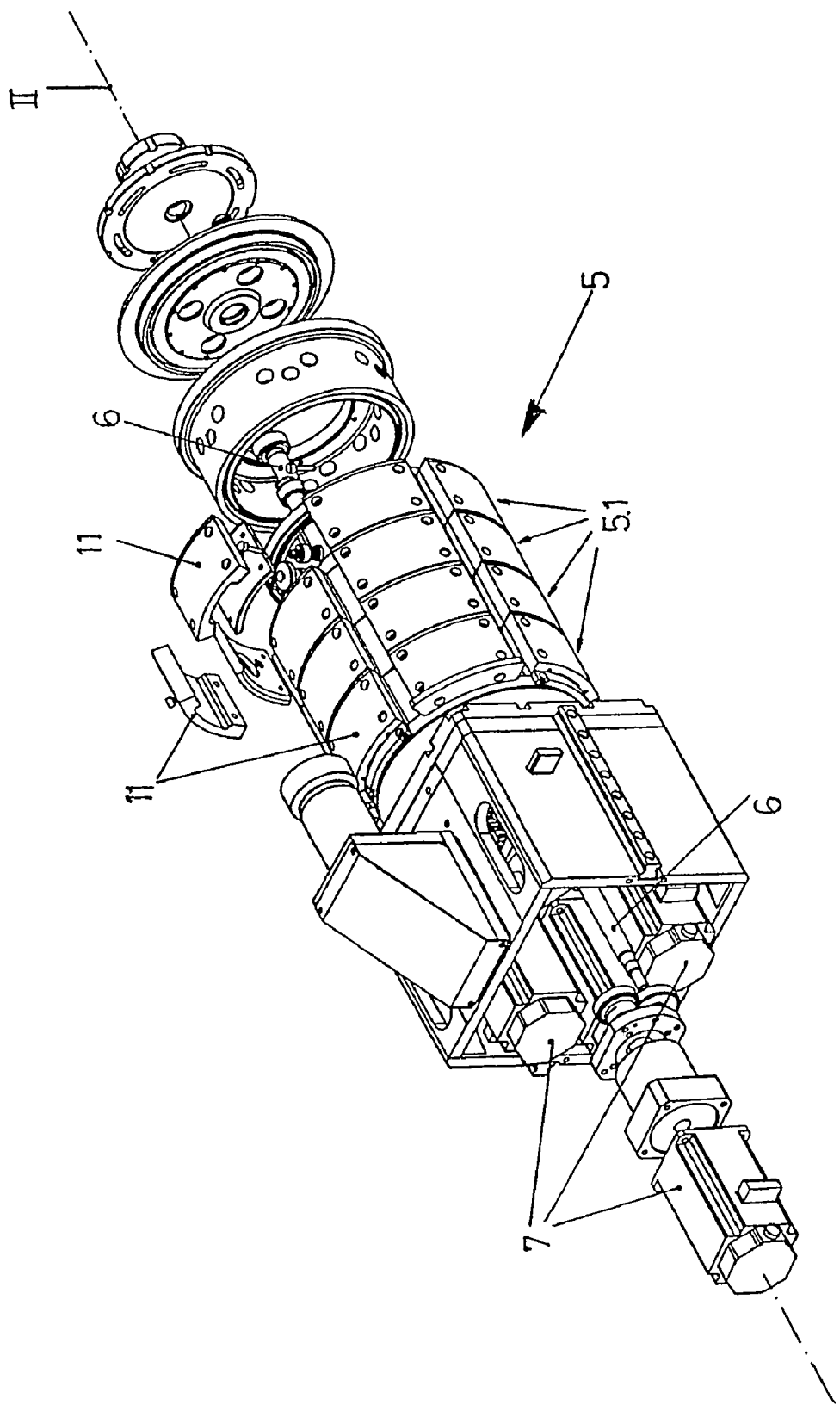
FIG. 8 is a partially exploded perspective view of the master roller (8) for assembling the reels (1) of carbon-fibre in the head of the invention.

As is seen in FIGS. 6, 8 and 9, the rings (5.1) are associated by means of respective rotary actuation transmissions (6), in relation to corresponding independent motors (7) which are controlled by a computer programme.

Figure 9A:
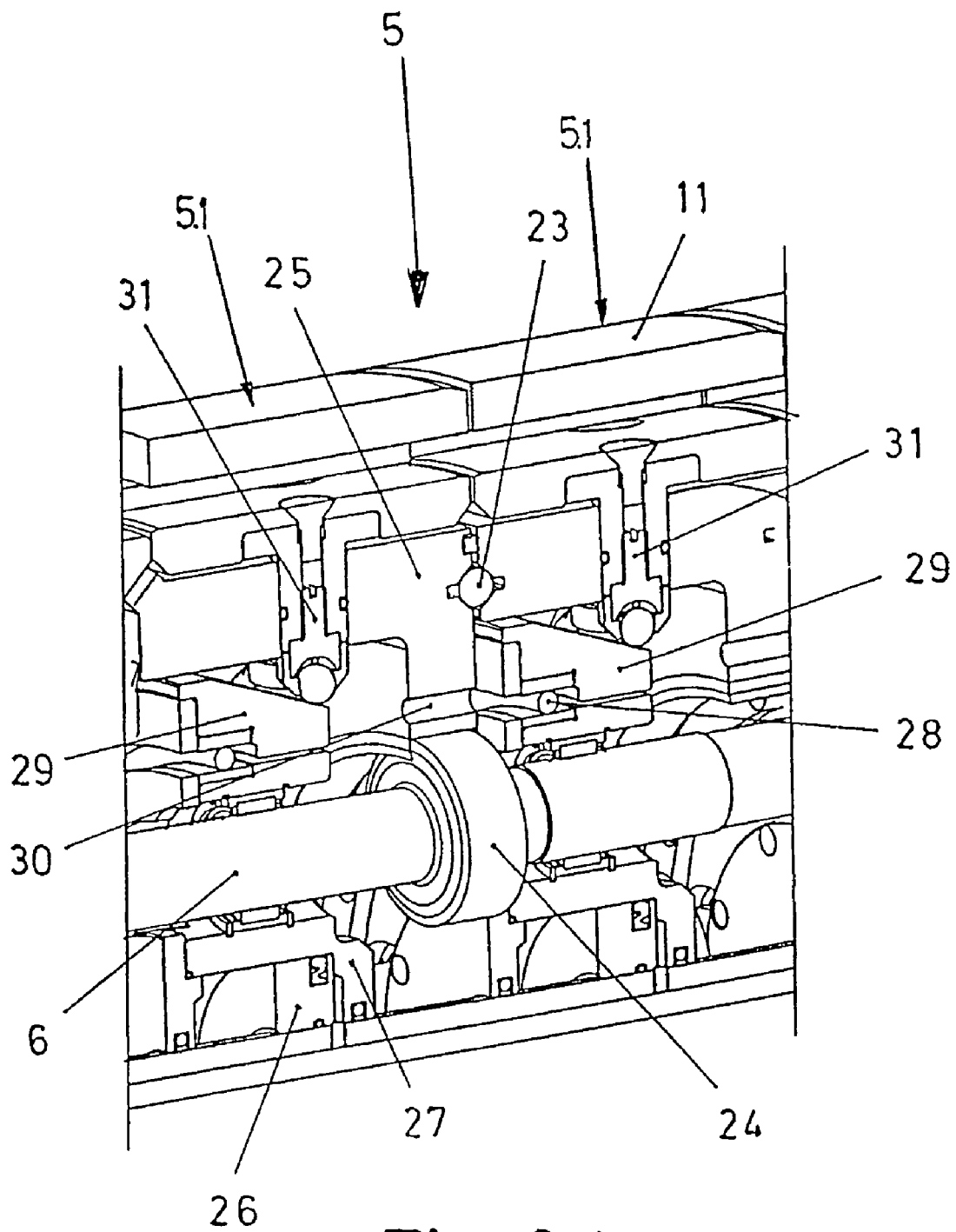
FIG. 9A is an enlarged detail of part of the previous figure.

The mentioned portions (5.1) of the master roller (5) are separated from one another by means of ball bearings (23)

arranged between the side contact faces of the consecutive portions (5.1), allowing the independent rotation of each of them, see FIG. 9 and 9A.

Said rotation of each of the portions (5.1) is controlled by its respective independent motor (7) which, as is seen in FIG. 9A, actuates a pinion (24) meshed with a crown (25) of the inside of the corresponding portion (5.1), such that the individual controlled rotation actuation of each portion (5.1) is ensured with this assembly, as described in Patent P200200524 of the same applicant as the present invention.

The reels (1) can thus rotate at different speeds in relation to one another, such that, for example, upon reaching a curved portion, the reel (1) corresponding to the strip which is on the outside of the curve "will run" more than the wheel which is next to it, and so on and so forth, such that all the reels are unwound at the same speed when leaving the curve.

Figure 11:
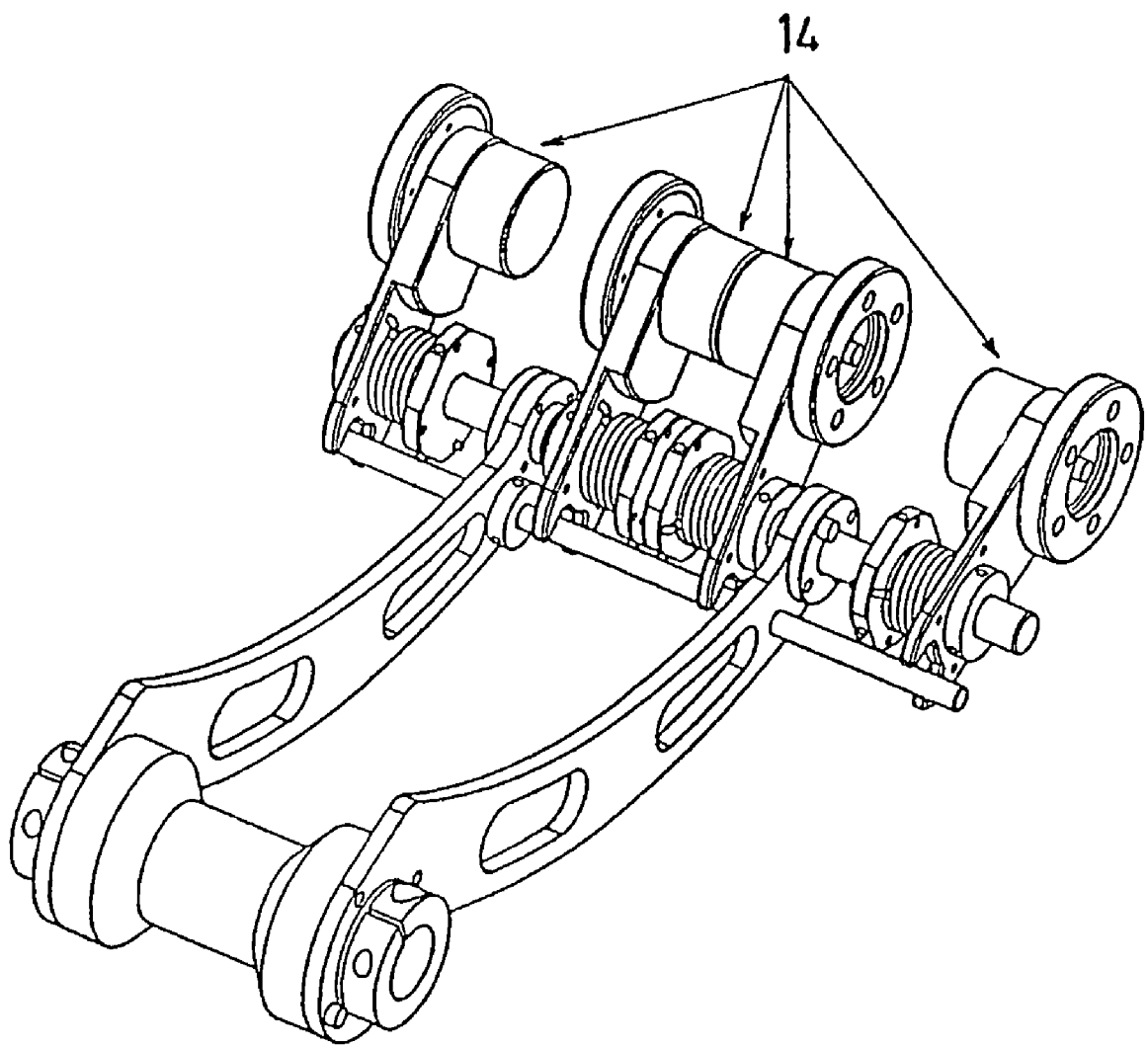
FIG. 11 is an enlarged perspective view of the block of sensors (14) for regulating the feed of the strips.

The carbon-fibre strips intended for the application are provided with the corresponding conventional protective paper preventing said strips from becoming stuck together when being wound on the reels (1), such that when said strips are applied on the surface to be formed, the protective paper is separated therefrom, being collected in take-up spools (8) which are arranged for that purpose in the same head, see FIG. 11.

Figure 12:
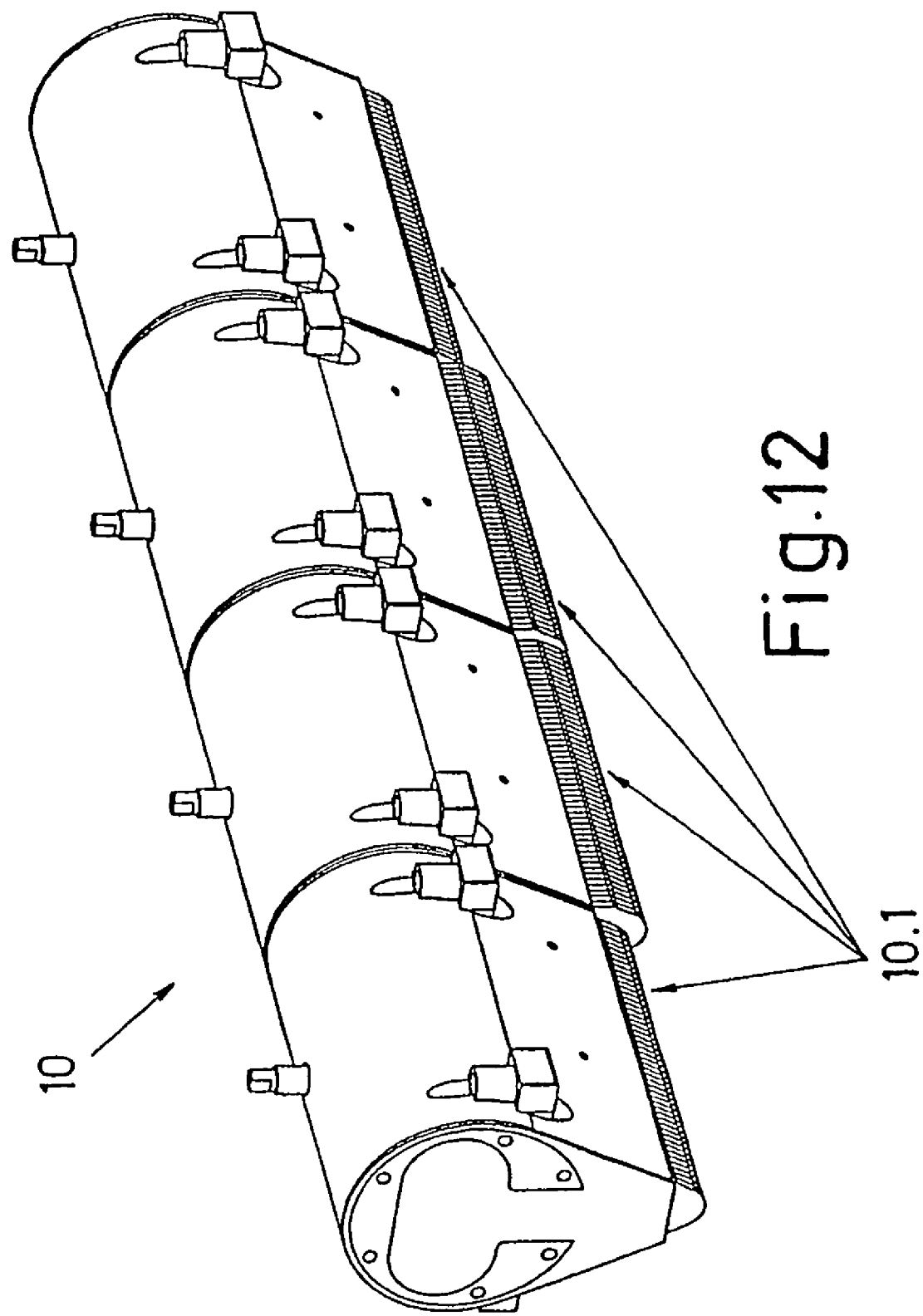
FIG. 12 is a perspective view of the heel (10) for pressing the carbon-fibre strips on the application surface.
Figure 13:
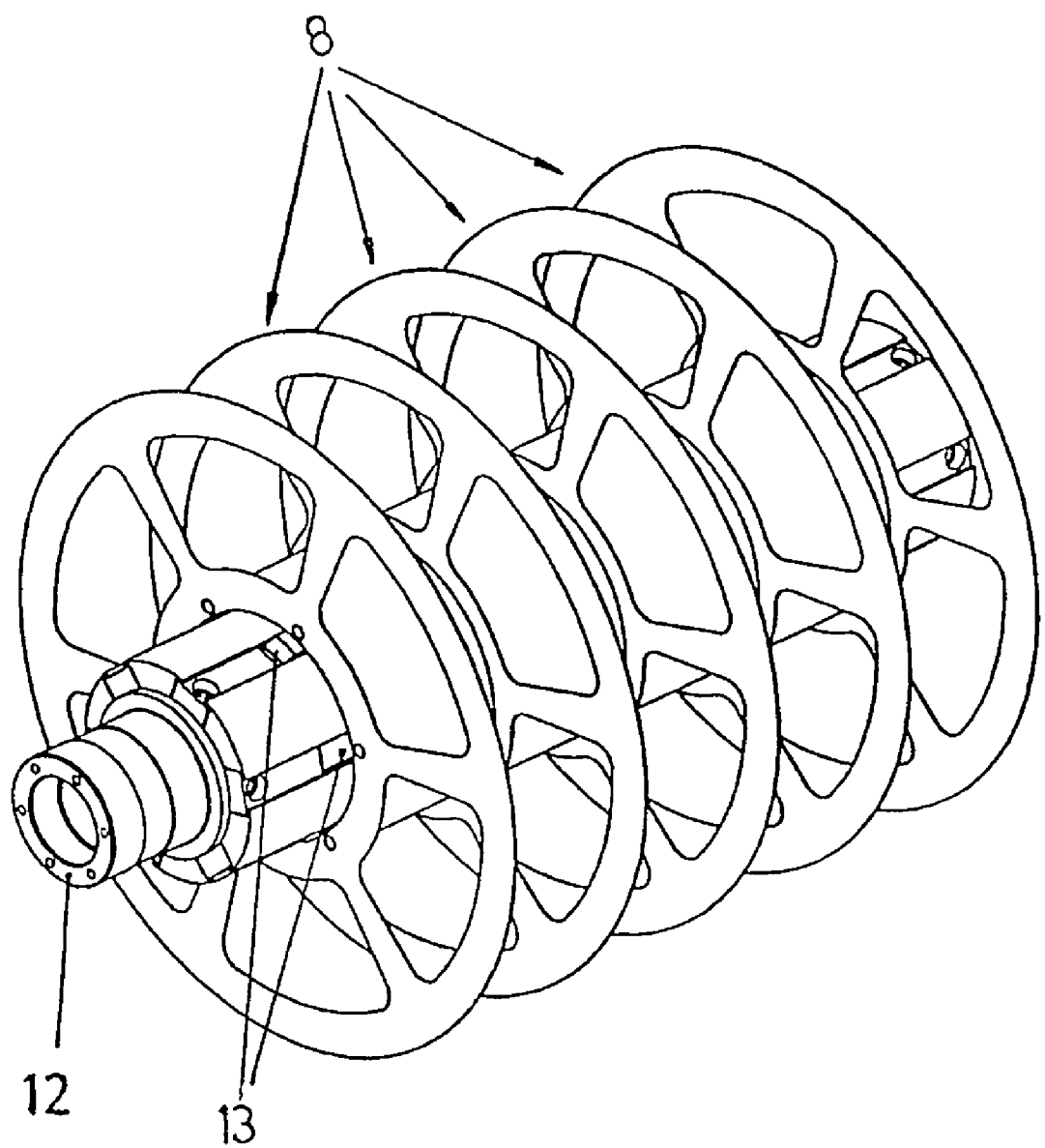
FIG. 13 is a perspective view of the block of reels (8) for taking up the protective paper from the carbon-fibre strips.

The carbon-fibre strips are conveyed from the feed reels (1) incorporated on the master roller (5) by guides (9), see FIG. 1, which keep them separate until reaching the application area where there is arranged a multiple heel (10) which is formed, as seen in FIG. 12, by independent pressure portions (10.1) for pressing on each of the strips, such that the application of each strip is applied or not on the surface to be formed by means of stripping according to said pressure.

In other words, in applying the carbon-fibre strips on the surface to be formed, the strips which are initially pressed against said surface by the corresponding portions (10.1) of the heel (10) are applied on the surface which is being formed, whereas the strips which are not pressed by the respective portions (10.1) of the heel (10) pass without being applied on the surface being formed; therefore, surfaces of any type can be formed by selecting the operation by means of operating control programming of the head, applying the formation strips only in the parts which must be covered with the application material.

The carbon-fibre strip feed reels (1) are assembled by means of an axial positioning arrangement by means of a longitudinal drive screw, in combination with optical sensors arranged in the guides (9) for conveying the strips, which allows performing an automatic control to align the strip feed reels (1) in correspondence with the respective guides (9).

Each of the portions (5.1) making up the master roller (5) is furthermore provided on its contour (see FIGS. 8 to 9A) with plates (11) susceptible of radial movement by means of a pneumatic system, such that a diametrical expansion of the mentioned portions (5.1) is produced by means of said plates (11) to fix thereon the reels (1), whereby the actuation of the strip feed for the application is actuated by means of the rotary transmission which is supplied to the portions (5.1) with the corresponding motors (7).

The radial movement of the plates (11) for the diametrical expansion of the portions (5.1) occurs in the following manner, see FIG. 9A.

When the pressure in a pneumatic chamber existing between a fixed piston (26) and an axially mobile jacket (27) increases, said jacket (27) is moved in the direction axial to the rotation of the corresponding portion (5.1), such that angular-contact four point bearings (28) existing between the mentioned jacket (27) and a bevelled ring (29) which is rotationally integral with the portion (5.1) transmit the longitudinal movement of the jacket (27) to said bevelled ring (29), at the same time allowing the jacket (27) to not rotate, whereas the bevelled ring (29) does rotate together with the portion (5.1), to which it is attached by means of pins or studs (30).

There is supported on the ramp of the bevelled ring (29) a part (31) provided at the end with a ball which is arranged in a radial direction, such that the longitudinal movement of the bevelled ring (29), caused by the pneumatically actuated axial movement of the jacket (27), causes the movement of the part (31) in a radial direction, since its end slides on the ramp of the bevelled ring (29), pushing said part (31) to the plate (11) arranged thereon.

Axial groovings are furthermore provided on the outer contour of the portions (5.1), by means of which perfect locking of the reels (1) on said portions (5.1) is ensured, preventing the relative rotary sliding to ensure perfect control of the reels (1).

In addition, the take-up spools (8) for taking up the protective paper of the carbon-fibre strips are incorporated, as seen in FIG. 11, on a shaft (12), being locked with respect thereto by means of a system of wedges (13) which are in turn actuated by means of a pneumatic system.

In relation to the carbon-fibre strips coming off the corresponding feed reels (1) incorporated on the master roller (5), sensors (14), depicted in FIG. 11, are arranged through which the carbon-fibre strips pass individually, such that the exit speed of each of the strips is controlled by means of said sensors (14), the actuation of the rotary transmission to the reels (1) by means of the corresponding motors (7) being regulated according to such speed to adjust the feed of each strip to the application speed for applying the same which is required at all times, preventing the occurrence of tension or pulling which causes a poor application.

The mentioned sensors (14) are furthermore arranged in an oscillating movement arrangement, which allows offsetting the variation of inertia of the reels (1) as the corresponding strip on said reels (1) is consumed, so that the tension of the strip is constant during the feed process, such that the application is uniform.

The application method for applying the carbon-fibre strips according to the system of the invention can be carried out by means of the described head, using two or more strips with a total width equivalent to the width of the stripping which allows covering the application surface with a minimum number of passes, but such that by controlling the speed for feeding each of the strips, the strips can be applied following the necessary straight and curved paths, such that in the straight application areas all the strips are fed at the same speed, but in the curved application areas the strips for application in the outer part of the curvature are fed at a higher speed than the strips for application in the inner part of the curvature, so that the application is uniform in the entire width of the application, without stretching the strips in the outer part and wrinkling them in the inner part. As indicated, at a given moment, it is even possible to apply only the strip of one reel (1) and not apply the strips of the remaining reels, or all the possible logical variants are possible, not applied, taking into account that four independent reels (1) can be used, according to the practical embodiment herein represented or with more reels (1) if necessary.

In these conditions, the application process can be established such that when a reel (1) runs out, said reel (1) is replaced individually, continuing with the rest of the reels (1) in the process until each of them runs out, to replace them individually in the same way. With this method the total exploitation of the carbon-fibre strips is achieved, but the process must be stopped many times to change each of the reels (1) when they run out.

The application method can likewise be established to replace all the carbon-fibre strip feed reels (1) when one of them runs out, whereby the number of stops needed is reduced, since all the reels (1) are changed in each replacement stop and therefore all of them resume the feed process starting from a situation in which they are completely filled. With this method there is however a loss of material, since all the remaining content of the unfinished reels (1) is disposed of when the replacement is carried out upon any reel (1) running out.

According to a particular option according to the invention and in relation to the feed of the carbon-fibre strips, a management software program in combination with a programme of successive application uses to form equal or different parts is applied, such that said software calculates the ranges of travel for applying the stripping which must be carried out in the different uses, determining an order for performing them, such that the greater consumption of some strips for application in some uses is offset with the greater consumption of the other strips in other uses, whereby all the reels (1) holding the strips for application run out at the same time. With this method all the reels (1) are changed in the same replacement stop, the carbon-fibre material of the strips furthermore being totally exploited, since there is no disposal waste.

Figure 4:
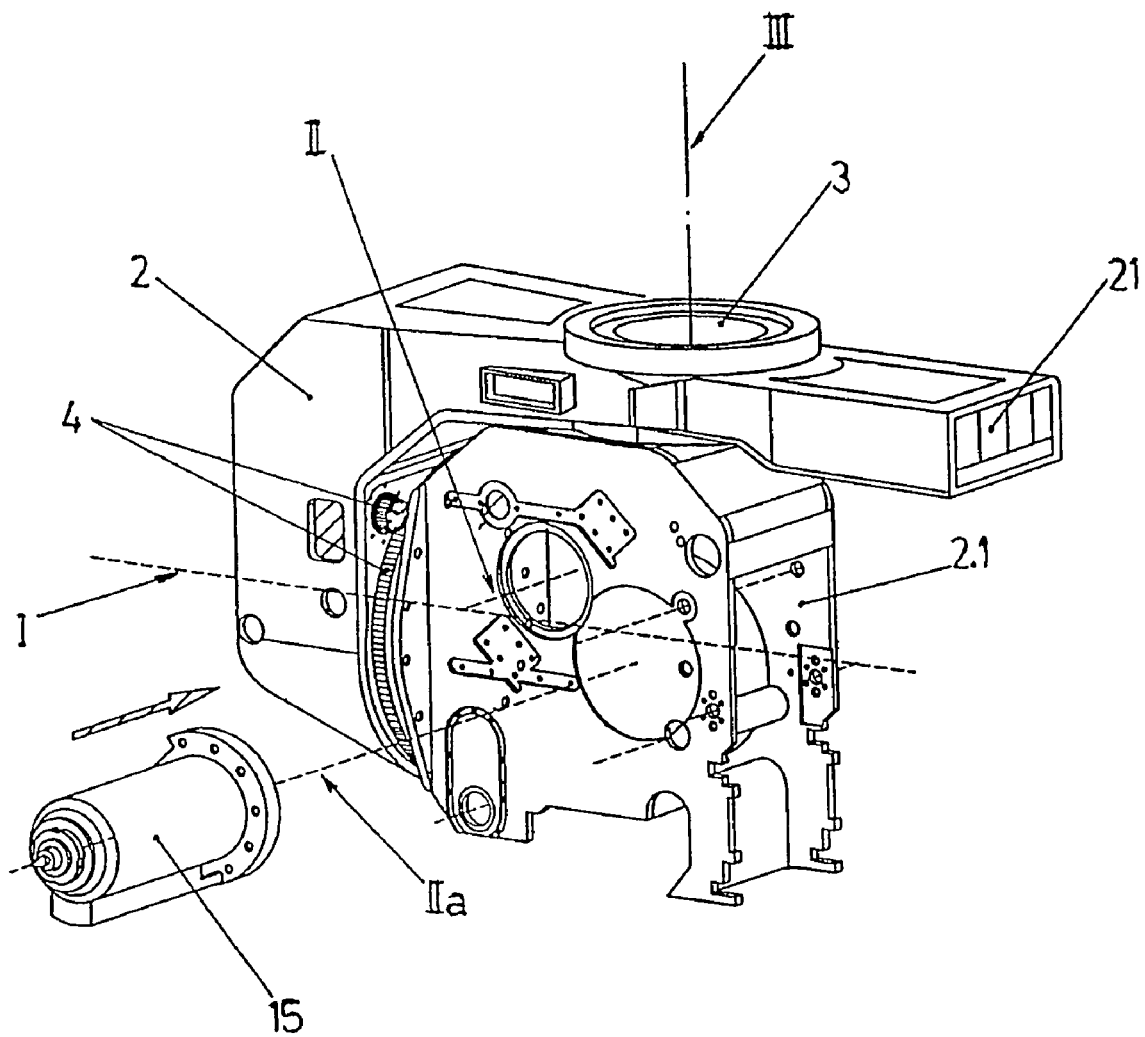
FIG. 4 shows a perspective view of the phase for assembling the ultrasound cutting unit (15).
Figure 5:
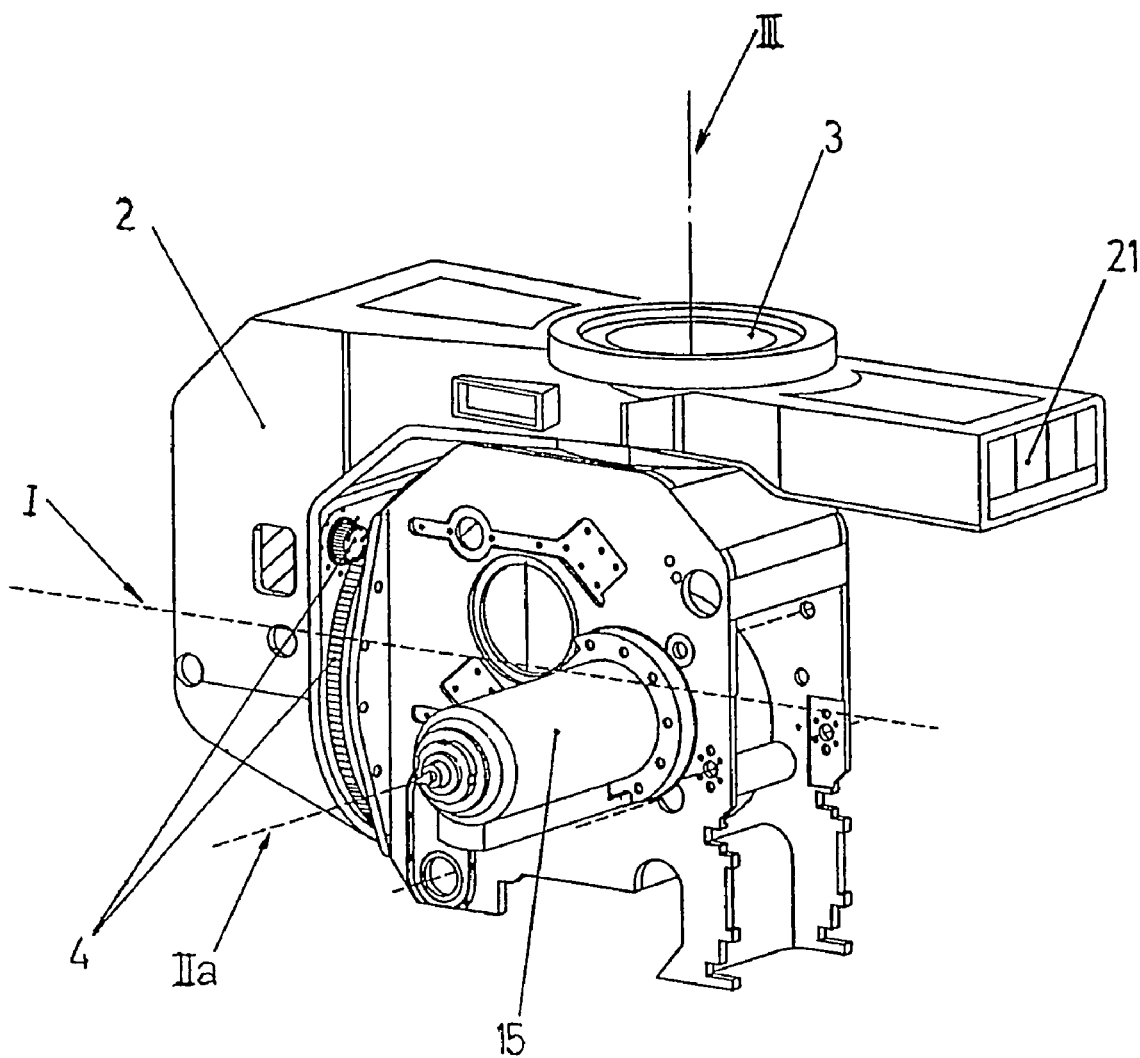
FIG. 5 is a view like FIG. 4 but with the ultrasound cutting unit (15) already assembled.

According to another feature of the invention, an ultrasound cutting unit (15) is incorporated in the head, which is arranged in an axis IIa parallel to axis II of the master roller (5), oriented towards the side of the head, see FIG. 4, 5 and 6.

Figure 14:
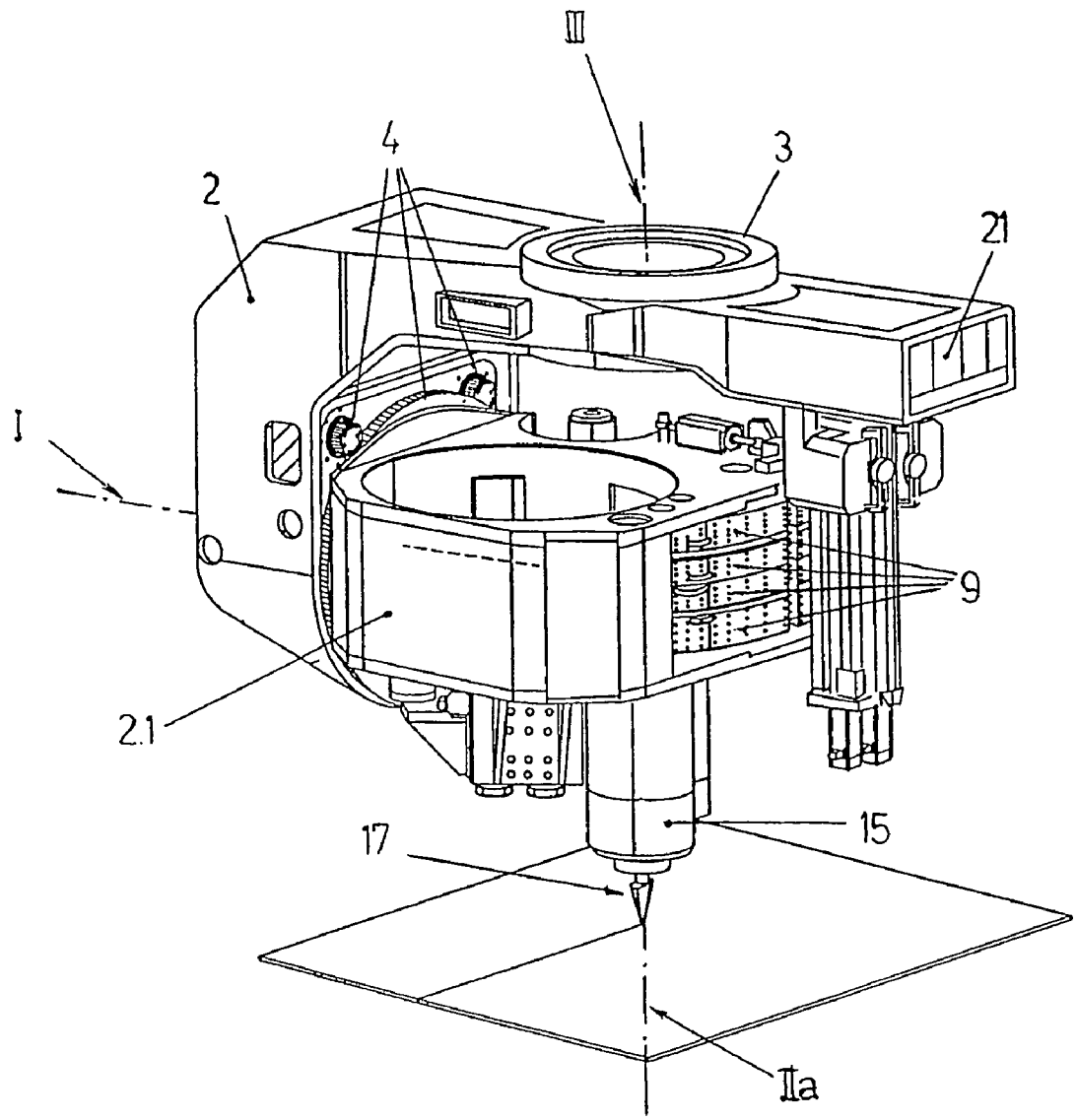
FIG. 14 is a perspective view of the head of the invention in the operative position of the cutting unit (15).

With this arrangement, by means of rotating the block (2.1) on the coupling (4) of the horizontal axis I, to a 90° position with respect to the carbon-fibre strip application position, as FIG. 14 depicts, the cutting unit (15) is in an operative position to be able to carry out the cutting of the remainder of the carbon-fibre strips used in the formation of the application surface.

With this the overall time of the process for manufacturing the parts which are formed with the carbon-fibre strips is reduced, since the same head which applies the strips cuts the remainder of said strips by means of a simple rotation of 90° of the block (2.1) of the head about axis I, between the application position depicted in FIG. 1 and the cutting depicted in FIG. 14.

As FIG. 14A shows, the cutting unit (15) has a rotation (CU) of the blade (17) by means of servo-controlled actuation which is actuated by a servomotor (18) through a pinion (19) and a crown (20), such that it is possible to thus cut the carbon-fibre material.

The blade (17) is axially excited by an ultrasonic frequency with an amplitude of a few tenths of a millimeter by means of which it can cut the remaining deposited and uncured material from the carbon-fibre strips, said frequency of the blade (17) being generated by a resonator (21) which is incorporated in the support (2) of the head, from which it is transmitted to a collector (22), which allows exciting the blade (17) even when it is rotationally actuated in the rotation (CU).

The invention claimed is:

1. Method of application of carbon-fibre strips comprising a head in which feed reels (1) are incorporated, by means of which a width of the carbon-fibre strips for application on a surface to be formed is formed, the feed reels (1) being on independent portions (5.1) of a master roller (5) which are individually actuated to rotate to the carbon-fibre strips for application, characterised in that in relation to the feed reels (1) to determine the application of a carbon-fibre strip by each feed reel according to what is required in each area of an application surface, an individual control of a speed of each of the feed reels (1) being determined to feed the carbon-fibre strips in application areas in a curve with greater speed for strips of an outer part of the curve than for those of an inner part, compensating for a difference of range of travel.

2. Method of application of carbon-fibre strips according to claim 1, characterised in that the feed of the carbon-fibre strips for the application is established with a control by means of a software program for selecting with respect to different consecutive uses for forming equal or different parts to offset higher consumption of some strips in some uses with higher consumption of other strips in other uses to have all of the feed reels (1) of the carbon-fibre strips for application run out at the same time.

3. The method of application of carbon-fibre strips according to claim 1, characterised in that the feed of the carbon-fibre strips for the application is established with a control of application pressure on the surface to be formed by means of an individual pressure multiple heel on each of the carbon-fibre strips, such that only portions of the strips that have to be applied on the surface to be formed are pressed.

4. A head of application of carbon-fibre strips in which feed reels (1) are incorporated, by means of which a width of the carbon-fibre strips for application on a surface to be formed is formed, the feed reels (1) being on independent portions (5.1) of a master roller (5) which are individually actuated to rotate to the carbon-fibre strips for application, characterised in that in relation to the feed reels (1) to determine the application of the strip by each feed reel according to what is required in each area of an application surface, an individual control of a speed of each of the feed reels (1) being determined to feed the carbon-fibre strips in application areas in curve with greater speed the strips of an outer part of the curve than those of an inner part, compensating for a difference of range of travel.

5. The head of application of carbon-fibre strips according to claim 4, characterised in that the feed of the carbon-fibre strips for the application is established with a control of application pressure on the surface to be formed by means of an individual pressure multiple heel on each of the carbon-fibre strips, such that only portions of the strips that have to be applied on the surface to be formed are pressed.

6. A head for application of carbon-fibre strips, of a type which are arranged in a rotation assembly on a vertical axis and its actual block or head on a horizontal axis, to perform stripping for formation of surfaces by means of a carbon-fibre strip which is fed from a plurality of feed reels and which is provided with a protective paper, material for the carbon-fibre strip applied on a surface to be formed by means of pressure against said surface, whereas the protective paper is taken up in a take-up spool, characterised in that a head is used in which there are arranged at least two of the feed reels (1) holding respective carbon-fibre strips for selective feed of said strips, forming therewith a width of the carbon-fibre strips for application, the feed reels (1) of the carbon-fibre strips for application being incorporated on a master roller (5) formed by independent portions (5.1) which are actuated individually by respective rotary transmissions, which allows independent feed of the carbon-fibre strips from the feed reels (1).

7. The head for application of carbon-fibre strips according to claim 6, characterised in that the head incorporates three or more than three feed reels (1), such that in the event that it incorporates four independent feed reels (1), each feed reel has a width of 75 mm; whereby, simultaneously applying the carbon-fibre strips of the four independent feed reels (1)

achieves a coverage width of 300 mm based on which the carbon-fibre strips of a lower number of said feed reels (1) can be applied until achieving the minimum width coverage, established upon applying the carbon-fibre strip of a single feed reel(1).

8. The head for application of carbon-fibre strips according to claim 6, characterised in that in relation to the feed of the carbon-fibre strips from the corresponding feed reels (1), sensors (14) controlling passage of said strips are arranged, regulating actuation of the rotary transmission of the feed reels (1) according to a necessary application speed of each of the carbon-fibre strips, wherein stripping areas with a curvature of strips of an outer part of the curvature are supplied at a higher speed than those of an inner part to offset a difference of a range of travel for the application of the strips.

9. The head for application of carbon-fibre strips according to claim 6, characterised in that the independent portions (5.1) of the master roller (5) further comprise plates (11) on a periphery of the master roller, said plates configured for individualised radial movement, actuated by means of a pneumatic system, which allows determining a diametrical expansion of said portions (5.1) for fixing the feed reels (1) thereon.

10. The head for application of carbon-fibre strips according to claim 6, characterised in that respective spools (8) are arranged in correspondence with a number of feed reels (1) which are incorporated on the master roller (5) for taking up the protective paper, said spools incorporated on a shaft (12) with respect to which the spools are fixed by means of a system of wedges (13) which are actuated by a pneumatic system.

11. The head for application of carbon-fibre strips according to claim 6, characterised in that an ultrasound cutting unit (15) is arranged parallel to a longitudinal axis of the master roller (5), said ultrasound cutting unit oriented towards a side of the head, and positionable in an operative position for cutting remainders of the carbon-fibre strips used in the application by means of rotating the head to a 90° position with respect to a carbon-fibre strip application position.

12. The head for application of carbon-fibre strips according to claim 11, characterised in that the head can rotate ±90° about a horizontal axis through its pinion-crown (4) actuation, which allows arranging the ultrasound cutting unit (15) in its operative position by simply rotating a shaft of the head.

* * * * *